(12) United States Patent
Shotey et al.

(10) Patent No.: US 8,586,864 B1
(45) Date of Patent: Nov. 19, 2013

(54) IN-USE ELECTRICAL OUTLET COVER WITH REMOVABLE CORD CATCH

(75) Inventors: Marcus J. Shotey, Scottsdale, AZ (US); Jeffrey P. Baldwin, Phoenix, AZ (US); Jason P. Baldwin, Mesa, AZ (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 13/440,958

(22) Filed: Apr. 5, 2012

Related U.S. Application Data

(60) Provisional application No. 61/471,961, filed on Apr. 5, 2011.

(51) Int. Cl.
*H02G 3/14* (2006.01)

(52) U.S. Cl.
USPC ............. 174/66; 174/67; 174/53; 220/241; 220/242

(58) Field of Classification Search
USPC ............ 174/480, 481, 50, 53, 57, 58, 66, 67; 220/3.2–3.9, 4.02, 241, 242; 439/535, 439/536; D13/177; D8/353
See application file for complete search history.

(56) References Cited

U.S. PATENT DOCUMENTS

| | | | |
|---|---|---|---|
| 6,133,531 A * | 10/2000 | Hayduke et al. | 174/67 |
| 6,806,426 B1 * | 10/2004 | Gretz | 174/67 |
| 7,381,895 B1 | 6/2008 | Shotey et al. | |
| 7,476,806 B2 | 1/2009 | Dinh | |
| 7,538,272 B1 * | 5/2009 | Shotey et al. | 174/66 |
| 7,762,415 B2 * | 7/2010 | Matsui | 220/3.2 |
| 8,013,245 B2 | 9/2011 | Korcz et al. | |
| 8,110,743 B2 * | 2/2012 | Drane | 174/67 |
| 8,119,912 B2 * | 2/2012 | Thibault et al. | 174/67 |
| 2007/0181328 A1 | 8/2007 | Dinh | |

* cited by examiner

*Primary Examiner* — Angel R Estrada
(74) *Attorney, Agent, or Firm* — Garrett V. Davis; Mark S. Bicks; Alfred N. Goodman

(57) ABSTRACT

An electrical outlet cover assembly includes a base with a base wall and a plurality of side walls, a lid hinged to the base, and at least one port extending through at least one base wall. A cord catch plate is removably placed in the at least one port, the cord catch plate having a reentrant opening therethrough off a side of the plate. Ports may be included on multiple walls, and multiple cord catch plates, or a blocking plate may be placed in other ports. A flexible flap or two may extend inward of a channel in the cord catch plate.

21 Claims, 9 Drawing Sheets

IN-USE ELECTRICAL OUTLET COVER WITH REMOVABLE CORD CATCH

CROSS REFERENCE TO RELATED APPLICATIONS

This document claims the benefit of the filing date of U.S. Provisional Patent Application 61/471,961 to Shotey et al. entitled "In-Use Cover with Cord Catch," which was filed on Apr. 5, 2011, the disclosure of which is hereby incorporated herein by reference.

BACKGROUND

1. Technical Field

Aspects of the present disclosure relate to weatherproof covers for electrical outlets.

2. Background Art

Electrical outlet covers are manufactured of a variety of materials and can be located on any number of electrical devices. While a number of electrical covers utilize adapter plates to fit various electrical devices, in-use covers include an opening near a bottom wall to permit a cord to pass out of the cover when the cover, also called a lid, is closed on the base.

When an electrical cord is connected to the electrical device within the electrical outlet cover, the cord is directed through an opening to exit the cover. When more than one electrical plug is inserted, both cords exit the same opening and may become tangled. Still further, the cables may not fill the entire opening and could allow bugs to enter the electrical outlet cover.

SUMMARY

According to an aspect, an electrical outlet cover, may comprise a base comprising a base wall and a plurality of side walls extending outwardly from the base wall, a lid hingedly coupled to the base, at least one port on at least one of the plurality of side walls, and at least one cord catch plate removably coupled to the at least one port, the at least one cord catch plate comprising a reentrant opening.

Particular implementations and embodiments may comprise one or more of the following. A perimeter of the at least one cord catch plate slides within a port channel of the port to removably couple the at least one cord catch plate to the at least one port. The reentrant opening of the at least one cord catch plate comprises a centrally located channel, a distribution opening, and at least one holding opening. The at least one holding opening may comprise two holding openings on opposing sides of the centrally located channel. The at least one cord catch plate may further comprise at least one tab proximate a bottom perimeter of a perimeter of the at least one cord catch plate, and two guides each proximate opposing side perimeters of the perimeter of the at least one cord catch plate, the two guides positioned to abut the port when the perimeter of the at least one cord catch plate is within the port channel. Two flexible flaps each coupled to opposing sides of the reentrant opening at the centrally located channel. The flaps may extend inwardly from the centrally located channel. The plurality of side walls may comprise four side walls, the at least one port comprises two ports on two different side walls of the four side walls, and the at least one cord catch plate comprises one cord catch plate removably coupled to one of the two ports, and wherein the electrical device cover further comprises a blocking plate removably coupled one of the two ports. A blocking plate perimeter of the blocking plate may slide within the port channel of one of the two ports to removably couple the blocking plate to the one of the two ports. The blocking plate may further comprise at least one blocking plate tab proximate a bottom perimeter of perimeter of the at least one cord catch plate, and two blocking plate guides each proximate opposing side perimeters of the perimeter of the at least one cord catch plate, the two blocking gate guides positioned to abut the port when the perimeter of the at least one cord catch plate is within the port channel. The block plate and the cord catch plate may be interchangeable between the two ports.

According to another aspect, an electrical device cover may comprise a base comprising a base wall and four side walls extending outwardly from the base wall, wherein at least two of the four side walls comprise a port opposite the base wall, a cord catch plate comprising a reentrant opening and removably coupled to the base in one port of the at least two sides walls comprising the port, a blocking plate removably coupled to the base in one port of the at least two side walls comprising the port, and a cover hingedly coupled to the base.

Implementations and embodiments may comprise one or more of the following. Each port may comprise a port channel and the cord catch plate and the blocking plate are removable coupled to respective ports by slidingly engaging the cord catch plate and blocking plate within the port channel of the respective port. The reentrant opening of the cord catch plate may comprise a centrally located channel, a distribution opening, and at least one holding opening. The at least one holding opening may comprise two holding openings on opposing sides of the centrally located channel. The cord catch plate and the blocking plate may each further comprise at least one tab proximate a bottom perimeter, and two guides each proximate opposing side perimeters, the two guides positioned to abut the port when the side perimeters are within the port channel. Two flexible flaps each coupled to opposing sides of the reentrant opening at the centrally located channel. The flaps may extend inwardly from the centrally located channel. The block plate and the cord catch plate may be interchangeable between the two ports.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Features of particular embodiments and implementations of electrical outlet covers will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended electrical outlet covers and/or assembly procedures for electrical outlet covers will become apparent for use with implementations of electrical outlet covers from this disclosure. Accordingly, for example, although particular electrical outlet covers are disclosed, such electrical outlet covers and implementing components may comprise any shape, size, style, type, model, version, measurement, concentration, material, quantity, and/or the like as is known in the art for such electrical outlet covers and implementing components, consistent with the intended operation of electrical outlet covers.

U.S. Pat. No. 7,538,272, which relates to an electrical device cover, is hereby incorporated by reference into this application.

Figure 1:
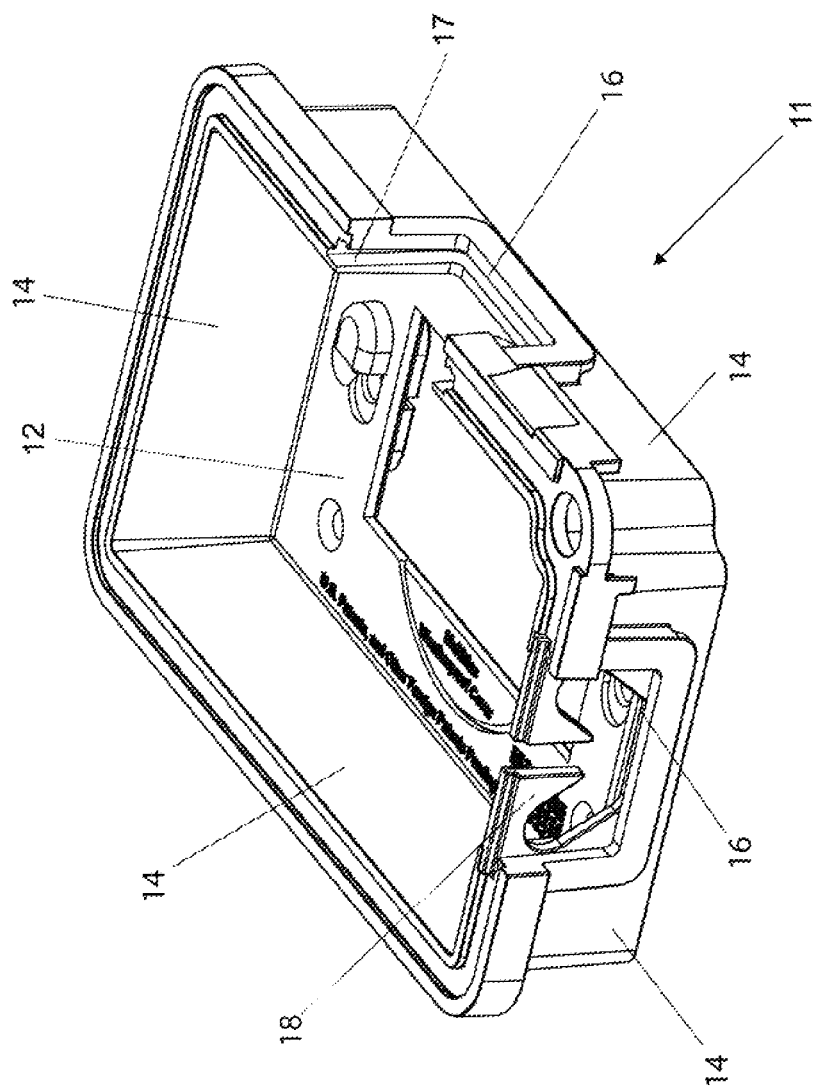
FIG. 1 is a perspective view of an electrical outlet cover with a cord catch plate.
Figure 2:
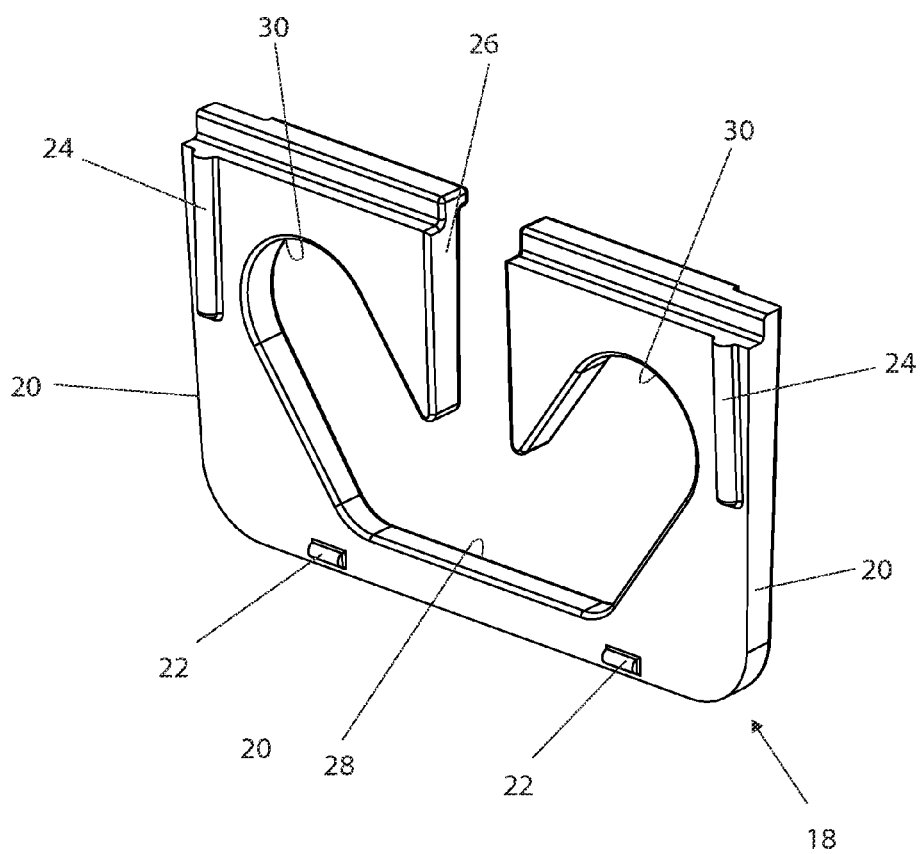
FIG. 2 is a perspective view of a first implementation of a cord catch plate.
Figure 3:
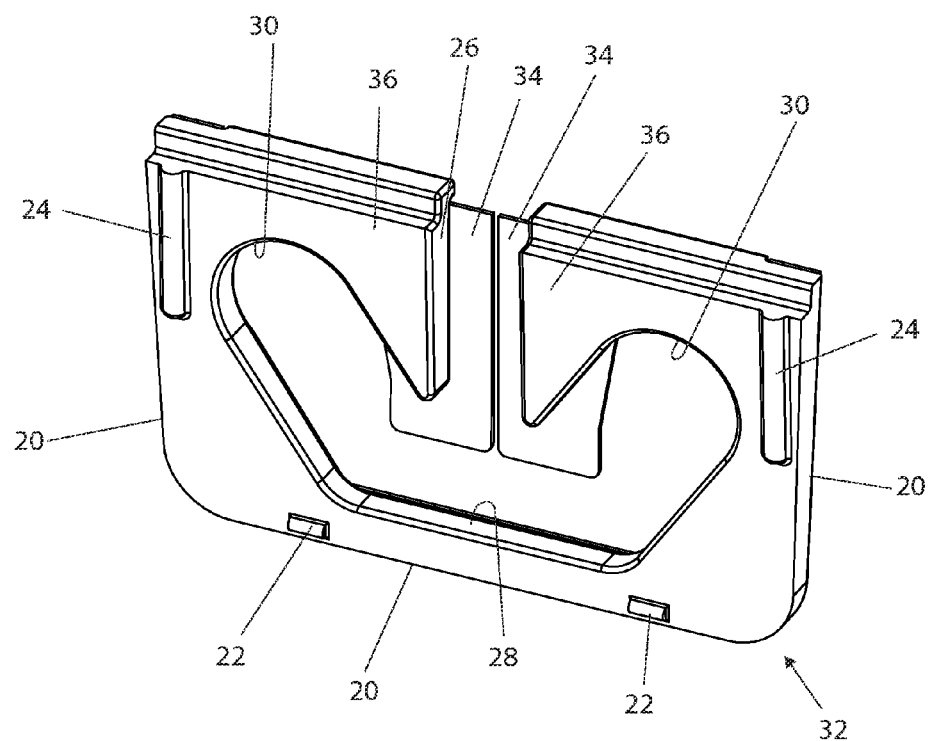
FIG. 3 is a perspective view of a second implementation of a cord catch plate.
Figure 4:
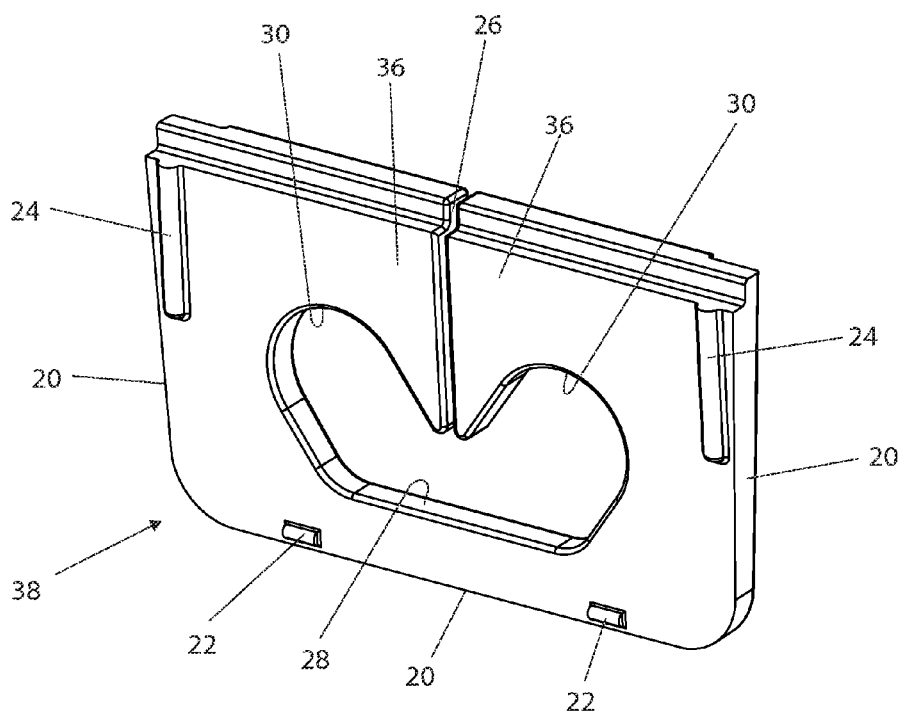
FIG. 4 is a perspective view of a third implementation of a cord catch plate.
Figure 5:
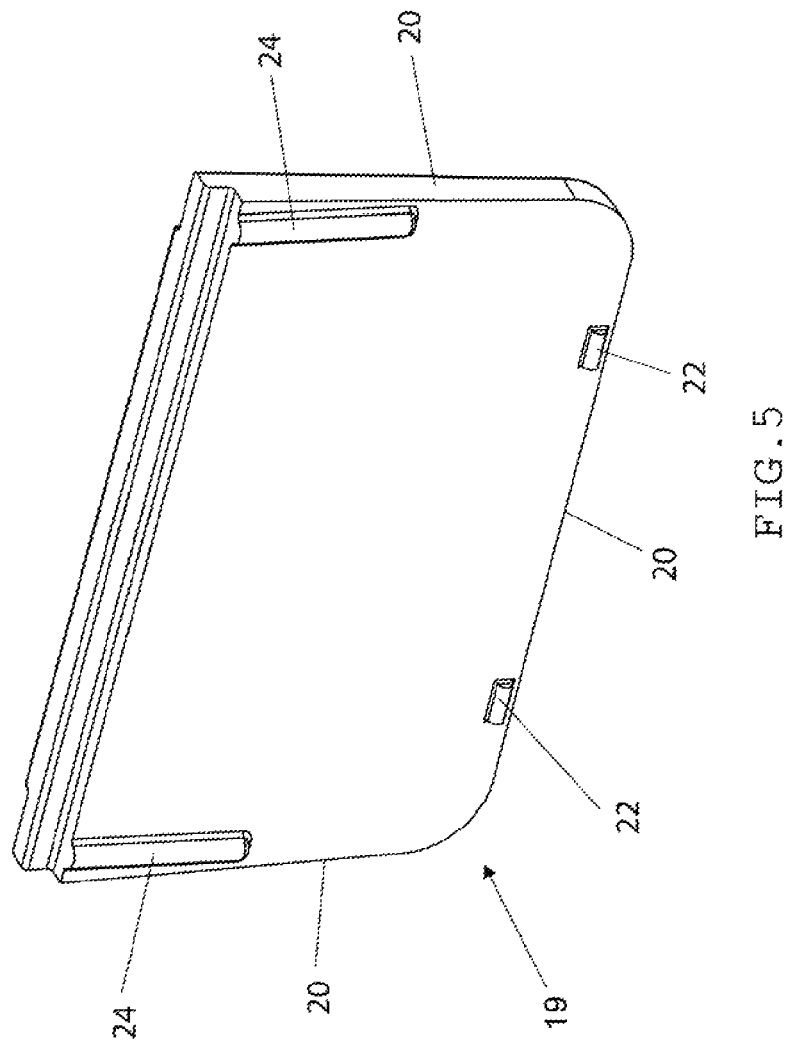
FIG. 5 is a perspective view of a blocking plate.

FIG. 1 illustrates a base 11 of an electrical outlet cover 10 with a cord catch plate 18 coupled thereto. FIGS. 2-4 illustrate various implementations of a cord catch plate, and FIG. 5 illustrates an implementation of a blocking plate 19. Electrical outlet cover 10 generally includes a cover (shown in FIGS. 6-7) and a base 11, the base 11 comprising a base wall 12 and a plurality of side walls 14 extending outward. At least one port 16 may be extend through side walls to provide an exit for electrical cords. In one aspect, two ports 16 are located on adjacent sides, although the ports may be located in other orientations. The remainder of base 11 includes an opening for an electrical device and/or keyholes for mounting the base to an electrical outlet.

Ports 16 are arranged to receive a cord catch plate 18 or a blocking plate 19 (see FIG. 5). Each port 16 may comprise a port channel 17 configured to allow a blocking plate 19 or cord catch plate 18 to slide within the port channel 17 in to the port 16. Blocking plate 19 is shaped similar to ports 16 and can be inserted to prevent debris, moisture, and bugs from entering the electrical outlet cover when the open port is not being used. Furthermore, blocking plate may comprise tabs 22 and guides 24 as described in relation to the cord catch plate 18 for assistance in interacting with the port channels 17.

In one aspect, cord catch plate 18 (FIGS. 1 and 2) includes an outer perimeter 20 approximately equal in dimensions to port 16 so that the cord catch plate may be slidingly received within port 16. Still further, cord catch plate 18 may include a pair of tabs 22 which secure the cord catch plate in place, while a pair of guides 24 ensure proper alignment within ports 16.

Cord catch plate 18 also includes a centrally located channel 26 leading an electrical cord into a distribution opening 28. From the distribution opening 28, each electrical cord can be directed to a holding opening 30 on each side of the distribution opening. In this arrangement, the electrical cords are located out of the way of one another for a cleaner appearance. Still further, the additional material included with the cord catch plate assists to prevent bugs and debris from entering open spaces in the ports. In one aspect, cord catch plate 18 may be composed of a rigid plastic, the same material as base 12, or any other suitable material within the spirit and scope of this disclosure.

Referring to FIG. 3, a second aspect cord catch plate 32 is shown where channel 26, distribution opening 28, and holding openings 30 each at least partially include a flexible material therein. Specifically, one or more flaps 34 are incorporated within the cord catch plate to take up some space once the electrical cords are located within holding openings 30. Flaps 34 preferably extend from a wall 36 on each side of and defining channel 26. Further, flaps 34 extend downward into the distribution opening and partially into the holding openings so that the edge of each flap 34 is adjacent an electrical cord located within the holding opening to once again reduce debris and bugs within the electrical outlet cover. Similar to previous aspects, cord catch plate 32 may be manufactured of a rigid plastic or any other suitable material, while flaps 34 are preferably formed from a flexible material that permits an electrical cord to deflect the flap during insertion and the flap returns to its original orientation.

Referring to FIG. 4, a third aspect cord catch plate 38 is illustrated wherein channel 26 is significantly smaller, if visible at all. In one aspect, channel 26 is once again formed by walls 36 and again leads to distribution opening 28 and holding opening 30. However, walls are preferably formed of a flexible material that permits an electrical cord to flex walls 36 to permit the electrical cable to enter distribution opening 28. Once the electrical cord is within distribution opening, it can once again be directed into holding opening 30. Still further, because cord catch plate 38 is flexible, the distribution opening and holding openings may both be smaller to once again reduce the likelihood of bugs or debris entering the electrical outlet cover.

Referring to FIGS. 6-7, the outlet cover 10 may further comprise a lid 50 hingedly coupled to the base 11. Although the lid 50 of FIGS. 6-7 comprises a bubble-type in-use lid, lid 50 may comprise any suitable lid known in the art for coupling to the base 11, such as a substantially flat or planar lid or even an expandable lid.

The lid 50 and the base 11 may be hingedly coupled together at any of the side walls 14. Accordingly, the base 11 may comprise base hinge elements 52 on at least one side wall of the plurality of side walls 14. Likewise, the lid 50 may comprise lid hinge elements 51 configured to mate and hingedly couple with the base hinge elements 52 of the base 11. The configuration of the hinge elements 51, 52 may comprise any configuration known in the art or otherwise incorporated into this patent application by reference.

In the implementation illustrated in FIGS. 6-7, the base 11 comprises hinge elements 52 on two side walls 14. Similarly, the lid 50 comprises lid hinge elements 51 on two sides of the lid 50, allowing the lid to hingedly couple with either of the two side walls 14 of the base 11 comprising hinge elements 52. Furthermore, in FIGS. 6-7, the side walls 14 of the base 11 comprising the hinge elements 52 are the two side walls 14 opposing side walls 14 comprising ports 16. In combination with the removable blocking plates 19 and cord catch plates 18, 32, 38, such a configuration provides various advantages to previously disclosed electrical outlet covers, as shall be discussed in particular reference to FIGS. 6 and 7.

Figure 6A:
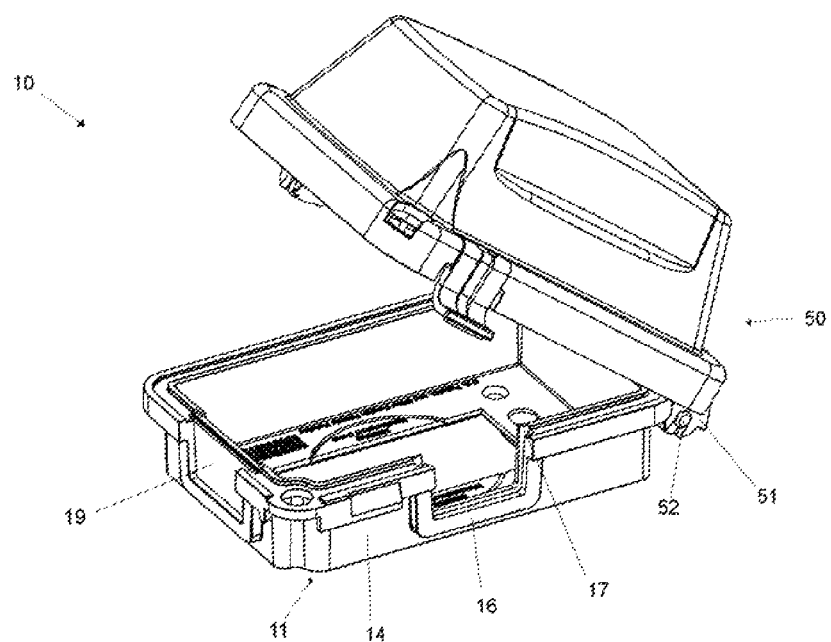
FIG. 6A is a perspective view of a lid hingedly coupled to a base at a top side wall.
Figure 6B:
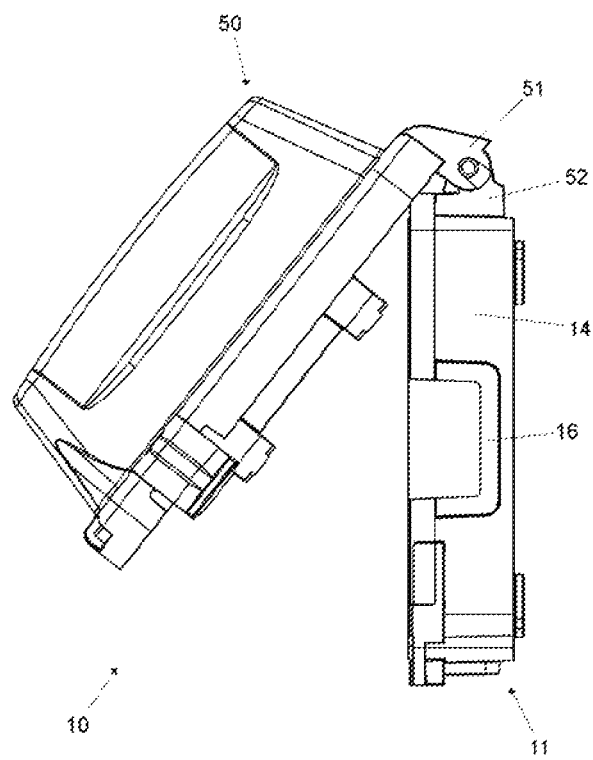
FIG. 6B is a side view of a lid hingedly coupled to a base at a top side wall.

Referring specifically to FIGS. 6A and 6B, the lid 50 may be hingedly coupled to a top wall of the four side walls 14, opposite the placement of blocking plate 19. If a user so desires, the blocking plate 19 may be removed from the port 16 shown in FIGS. 6A and B, and placed in the port 16 on a side wall 14 adjacent to the hingedly coupled elements 52.

Figure 7A:
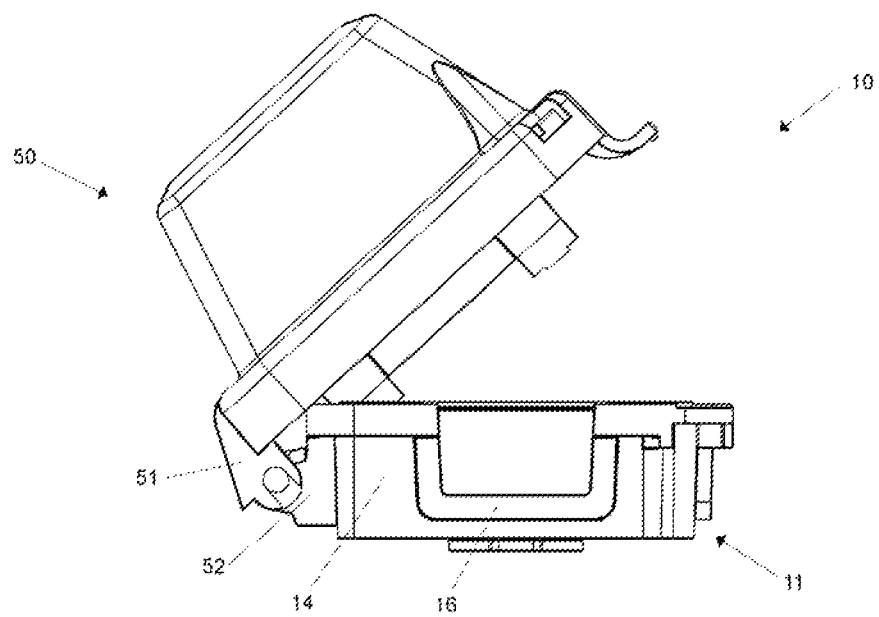
FIG. 7A is a bottom view of a lid hingedly coupled to a base at a side wall.
Figure 7B:
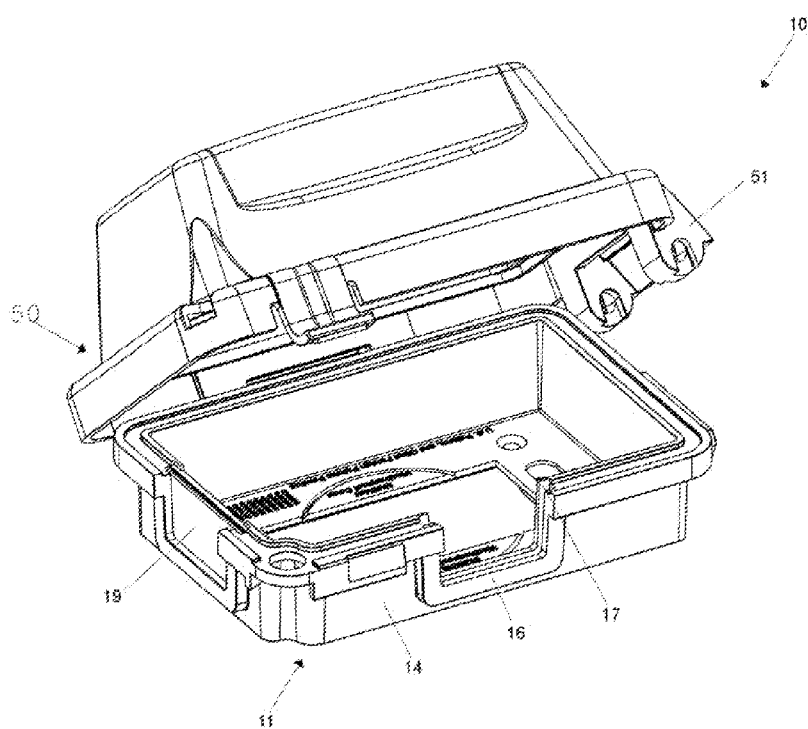
FIG. 7B is a perspective view of a lid hingedly coupled to a base at a side wall.

Referring specifically to FIGS. 7A and 7B, the lid 50 may be hingedly coupled to a vertical wall of the four side walls 14, adjacent the placement of blocking plate 19. If a user so desires and depending upon which orientation, horizontal or vertical, the electrical outlet cover is oriented when it is mounted, the blocking plate 19 may be removed from the shown port 16 in FIGS. 7A and 7B, and placed in the port 16 on a side wall opposite 14 opposite the hingedly coupled elements.

Implementations of the electrical cover 10 may comprise hinged elements 51, 52 on two sides of the base 11 and cover 50, respectively, such that the same electrical outlet cover 10 may be configured as either the configuration of FIG. 6 or FIG. 7. Furthermore, a user may interchange the blocking plates 19 and cord catch plates 18, 32, 38 in any desired combination in the plurality of ports 16. In most mounting configurations, the cord port plate 18 will be placed in the port on the bottom side of the base when the assembly is mounted to a wall, and the blocking plate 19 will be placed in the port on the side wall of the base when the assembly is mounted to a wall.

It will be understood that implementations are not limited to the specific components disclosed herein, as virtually any components consistent with the intended operation of a method and/or system implementation for an electrical outlet cover with cord catch plates may be utilized. Accordingly, for example, although particular bodies, arms, springs, and other components are disclosed, such components may comprise any shape, size, style, type, model, version, class, grade, measurement, concentration, material, weight, quantity, and/or the like consistent with the intended operation of a method and/or system implementation for an electrical outlet cover with cord catch plates. Implementations are not limited to uses of any specific components, provided that the components selected are consistent with the intended operation of a method and/or system implementation for an electrical outlet cover with cord catch plates.

Accordingly, the components defining any electrical outlet cover with cord catch plates implementation may be formed of any of many different types of materials or combinations thereof that can readily be formed into shaped objects provided that the components selected are consistent with the intended operation of an electrical outlet cover with cord catch plates implementation. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any electrical outlet cover with cord catch plates implementation may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld (e.g. an ultrasonic weld), a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The implementations listed here, and many others, will become readily apparent from this disclosure. From this, those of ordinary skill in the art will readily understand the versatility with which this disclosure may be applied.

The invention claimed is:

1. An electrical outlet cover, comprising:
   a base comprising a base wall and a plurality of side walls extending outwardly from the base wall;
   a lid hingedly coupled to the base;
   at least one port on at least one of the plurality of side walls; and
   at least one rigid cord catch plate removably coupled to the at least one port, the at least one cord catch plate comprising a reentrant opening having a cord distribution opening, an open channel extending from a top edge of said cord catch plate to said cord distribution opening, and at least one cord holding opening for receiving a cord.

2. The electrical outlet cover of claim 1, wherein a perimeter of the at least one cord catch plate slides within a port channel of the port to removably couple the at least one cord catch plate to the at least one port.

3. The electrical device cover of claim 1, wherein the at least one holding opening comprises two holding openings on opposing sides of the centrally located channel, each of said cord holding openings has a dimension to receive a cord.

4. The electrical device cover of claim 3, further comprising at least one flexible flap coupled to a side of the reentrant opening at the centrally located channel.

5. The electrical device cover of claim 4, wherein the at least one flexible flap extends inwardly from the centrally located channel.

6. The electrical device cover of claim 1, wherein the at least one cord catch plate further comprises:
   at least one tab proximate a bottom edge of a perimeter of the at least one cord catch plate; and
   two guides each proximate opposing side perimeters of the perimeter of the at least one cord catch plate, the two guides positioned to abut the port when the perimeter of the at least one cord catch plate is within the port channel.

7. The electrical device cover of claim 1, wherein the plurality of side walls comprises four side walls, the at least one port comprises two ports on two different side walls of the four side walls, and the at least one cord catch plate comprises one cord catch plate removably coupled to one of the two ports, and wherein the electrical device cover further comprises a blocking plate removably coupled one of the two ports, said blocking plate being slidably received in a channel to couple said blocking plate to said base.

8. The electrical device cover of claim 7, wherein a blocking plate perimeter of the blocking plate slides within a port channel of one of the two ports to removably couple the blocking plate to the one of the two ports.

9. The electrical device cover of claim 8, wherein the blocking plate further comprises:
   at least one blocking plate tab proximate a bottom perimeter of perimeter of the at least one cord catch plate; and
   two blocking plate guides each proximate opposing side perimeters of the perimeter of the at least one cord catch plate, the two blocking gate guides positioned to abut the port when the perimeter of the at least one cord catch plate is within the port channel.

10. The electrical device cover of claim 9, wherein the blocking plate and the cord catch plate are interchangeable between the two ports.

11. The electrical outlet cover of claim 1, further comprising a flexible flap coupled to said cord catch plate and extending into said open channel.

12. The electrical outlet cover of claim 11, wherein said flexible flap extends into said cord holding opening.

13. The electrical outlet cover of claim 1, further comprising
   a first flexible flap coupled to said cord catch plate and extending into said open channel and into a first cord holding opening, and
   a second flexible flap coupled to said cord catch plate and extending into said open channel and into a second cord holding opening.

14. An electrical device cover, comprising:
   a base comprising a base wall and four side walls extending outwardly from the base wall, wherein at least two of the four side walls comprise a port opposite the base wall;
   a cord catch plate comprising a reentrant opening and removably coupled to the base in one port of the at least two sides walls comprising the port, said reentrant opening having a first cord holding opening with a dimension to receive a cord, a second cord holding opening adjacent said first cord opening and having a dimension for receiving the cord, a distribution opening between said first cord holding opening and said second cord holding opening, and a centrally located channel extending between a top edge of said cord catch plate and said distribution opening;
   a blocking plate removably coupled to the base in one port of the at least two side walls comprising the port; and
   a cover hingedly coupled to the base.

15. The electrical device cover of claim 14, wherein each port comprises a port channel and the cord catch plate and the blocking plate are removable coupled to respective ports by slidingly engaging the cord catch plate and blocking plate within the port channel of the respective port.

16. The electrical device cover of claim 14, wherein the cord catch plate and the blocking plate each further comprise:
   at least one tab proximate a bottom perimeter; and
   two guides each proximate opposing side perimeters, the two guides positioned to abut the port when the side perimeters are within the port channel.

17. The electrical device cover of claim 14, further comprising at least one flexible flap coupled said cord catch plate and extending into said centrally located channel.

18. The electrical device cover of claim 14, wherein said cord catch plate is made of a rigid material and said cord catch plate further comprises a first flexible flap coupled to a first side of said cord catch plate and extending into said centrally located channel, and into said first cord holding opening, and a second flexible flap coupled to a second side of said cord catch plate and extending into said centrally located channel and said second cord holding opening.

19. The electrical device cover of claim 14, wherein the block plate and the cord catch plate are interchangeable between the two ports.

20. An electrical outlet cover, comprising:
   a base comprising a base wall and a plurality of side walls extending outwardly from the base wall;
   a lid hingedly coupled to the base;
   at least one port on at least one of the plurality of side walls; and
   a flexible cord catch plate removably coupled to the at least one port, the at least one cord catch plate having a first flexible wall and a second flexible wall extending inwardly with respect to said cord catch plate to define a channel therebetween, a first cord holding opening in said first flexible wall and having a dimension to receive a cord, a second cord holding opening in said second flexible wall and having a dimension to receive a cord, and a cord distribution opening between said first and second cord holding openings, and where said channel extends between a top edge of the cord catch plate and said distribution opening and between said first and second cord holding openings.

21. The electrical device cover of claim 20, wherein the cord catch plate further comprises:
- at least one tab proximate a bottom edge of a perimeter of the at least one cord catch plate; and
- two guides each proximate opposing side perimeters of the perimeter of the at least one cord catch plate, the two guides positioned to abut the port when the perimeter of the at least one cord catch plate is within the port channel.

* * * * *